(12) United States Patent
Yamada et al.

(10) Patent No.: US 7,829,821 B2
(45) Date of Patent: Nov. 9, 2010

(54) VEHICLE HEATING APPARATUS

(75) Inventors: Katsuhisa Yamada, Saitama (JP); Koji Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 922 days.

(21) Appl. No.: 11/493,955

(22) Filed: Jul. 27, 2006

(65) Prior Publication Data
US 2007/0045292 A1 Mar. 1, 2007

(30) Foreign Application Priority Data
Aug. 15, 2005 (JP) ............................. 2005-235201

(51) Int. Cl.
*B60L 1/02* (2006.01)
(52) U.S. Cl. .................. 219/202; 219/217; 219/492; 219/494
(58) Field of Classification Search ............... 219/202, 219/204, 211, 212, 217, 490, 492, 494
See application file for complete search history.

(56) References Cited

U.S. PATENT DOCUMENTS

| 5,501,073 A * | 3/1996 | Miyashita et al. ............ 60/284 |
| 6,893,086 B2 | 5/2005 | Bajic et al. |
| 7,214,906 B1 * | 5/2007 | Hansen et al. ............... 219/204 |
| 2004/0118555 A1 * | 6/2004 | Fristedt et al. .............. 165/202 |
| 2005/0072772 A1 * | 4/2005 | Livingstone ................. 219/494 |

FOREIGN PATENT DOCUMENTS

| JP | 2001-106146 | 4/2001 |
| JP | 2002-316575 | 10/2002 |
| JP | 2005-519726 T | 7/2005 |

* cited by examiner

*Primary Examiner*—Tu B Hoang
*Assistant Examiner*—Vinod D Patel
(74) *Attorney, Agent, or Firm*—Carrier, Blackman & Associates PC; William D. Blackman; Joseph P. Carrier

(57) ABSTRACT

A vehicle heating apparatus which directly detects an anomaly in temperature sensors for a heated portion of a vehicle or other device, including first and second front thermistors and first and second rear thermistors in front and rear seats, respectively, and a heater controller which stops a front heater group when a difference between temperatures detected respectively by the first and second front thermistors reaches a predetermined threshold value and which stops a rear heater group when a difference between temperatures detected respectively by the first and second rear thermistors reaches a predetermined threshold value.

20 Claims, 5 Drawing Sheets

VEHICLE HEATING APPARATUS

CROSS-REFERENCE TO RELATED APPLICATIONS

The present invention claims priority under 35 USC 119 based on Japanese patent application No. 2005-235201, filed on Aug. 15, 2005. The subject matter of this priority document is incorporated by reference herein.

BACKGROUND OF THE INVENTION

1. Field of the Invention

The present invention relates to a vehicle heater apparatus which heats a component adapted to be contacted by a portion of a body of a rider in a vehicle.

2. Description of the Background Art

Conventionally, it has been known to provide a vehicle with a heating apparatus such as discussed above, e.g., a seat heating apparatus in which a heating wire is provided inside a seating surface of a seat. See Japanese Patent Laid-open No. 2001-106146.

In the above-mentioned known heater apparatus, the temperature of a heated portion (seating surface of a seat) is controlled by a thermostat provided for each heating element. The thermostat plays a role in constantly maintaining the temperature of the heated portion by alternately turning the power supply to the heating element on and off depending on the temperature of the heated portion, where the temperature is monitored by one or more temperature sensors such as a bimetal or a thermistor.

However, in the heater apparatus of this reference, when a failure or anomaly occurs in the temperature sensor(s) itself, the anomaly cannot be directly detected. Accordingly, an improvement on this point is desired.

SUMMARY OF THE INVENTION

Accordingly, it is an object of the present invention to provide a vehicle heating apparatus which makes it possible to directly detect an anomaly in temperature sensors for a heated portion.

To achieve the above mentioned object and as a solution to the above described disadvantage, according to a first aspect of the invention there is provided a vehicle heating apparatus (e.g., a heating apparatus 50 of an embodiment of the present invention described later) in which a heater (e.g., each of heater groups 52, 55, and 62 of the embodiment) is provided in a component (e.g., each of front and rear seats 27 and 28, and right and left grips 44 and 45 of the embodiment) to be contacted with a portion of a body of a rider. The vehicle heating apparatus includes: first and second temperature sensors (e.g., first and second front thermistors 53 and 54, first and second rear thermistors 56 and 57, or right and left thermistors 63 and 64 of the embodiment) which detect the temperature of the component to be contacted with a portion of a body of the rider; and a controller (e.g., a heater controller 71 of the embodiment) which stops actuation of the heater when a difference between temperatures detected respectively by the first and second temperature sensors reaches a predetermined threshold value.

According to a second aspect of the invention, a vehicle heating apparatus according to the first aspect further includes an anomaly alarm (e.g., an anomaly warning lamp 77 of the embodiment) for notifying a user (e.g., the rider), as an anomaly in the temperature sensors, of an event in which the difference between the detected temperatures reaches the predetermined threshold value, when it occurs.

According to a third aspect of the invention, an output from the heater is controlled based on an average of the temperatures detected by the first and second temperature sensors.

According to a fourth aspect of the invention, the vehicle heating apparatus includes a plurality of heater sets (e.g., a front seat heater set 52c, a rear seat heater set 55c, and a grip heater set 62c of the embodiment) each including said heater and said first and second temperature sensors, wherein actuation of the heater in each said heater set is stopped only when the difference between the temperatures detected by the sensors in the corresponding heater set reaches the predetermined threshold value.

According to a fifth aspect of the invention, there is provided a vehicle heating apparatus (e.g., the vehicle heating apparatus 50 of the embodiment) in which a heater (e.g., heater groups 52, 55, and 62 of the embodiment) is provided in a component (e.g., the front and rear seat 27 and 28, and the right and left grips 44 and 45 of the embodiment) to be contacted with a portion of a body of a rider. The vehicle heating apparatus comprises an: engine operation detector (e.g., an ECU 78 of the embodiment) which detects an operating state of an engine; and a controller (e.g., the heater controller 71 of the embodiment) which stops actuation of the heater based on a detection signal from the engine operation detector.

According to a sixth aspect of the invention, in the vehicle heating apparatus according to any of the first through fifth aspects the heater is a seat heater (e.g., a seat heater 51 of the embodiment), and the first and second temperature sensors are placed inside a seat (e.g., the front or rear seats 27 or 28 of the embodiment) in a vicinity of a boundary between a seating portion (e.g., a front or rear seat body 27a or 28a of the embodiment) and a backrest portion (e.g., a backrest 27b or a seat back 28b of the embodiment).

According to a seventh aspect of the invention, in the vehicle heating apparatus according to any of the first through fifth aspects the heater is a grip heater (e.g., a grip heater 61 of the embodiment) of a handlebar (e.g., a handlebar 43 of the embodiment) for a two-wheeled motor vehicle, and the first and second temperature sensors are placed inside the grips (e.g., right and left grips 44 and 45 of the embodiment) on the backsides of the grips in vicinities of side ends thereof.

According to an eighth aspect of the invention, in the vehicle heating apparatus according to any of the first through seventh aspects the first and second temperature sensors are integrally provided.

According to a ninth aspect of the invention, in the vehicle heating apparatus according to any of the first through seventh aspects the first and second temperature sensors and the heating mechanism are integrally provided.

According to the first aspect of the invention, in a case where an anomaly occurs in one of the first and second temperature sensors, the difference between the temperatures detected by the first and second temperature sensors becomes wider. In addition, in a case where this temperature difference reaches a predetermined threshold value, actuation of the heater is stopped, and the temperature of the heated portion (component to be contacted with a portion of a body of the rider) drops. This enables the rider to directly detect an anomaly in the temperature sensors.

According to the second aspect of the invention, when the alarm provides a warning the rider can detect an anomaly in the temperature sensors earlier and more accurately than when the rider senses a temperature drop in the component to be contacted with the body of the rider.

According to the third aspect of the invention, two temperature sensors detect the temperature of the component to be contacted with a portion of a body of the rider. Thus, the temperature of the component to be contacted with a portion of a body of the rider can be detected more accurately by the two temperature sensors than it is detected by a single temperature sensor, and the output from the heater can be accurately controlled based on the detected temperatures.

According to the fourth aspect of the invention, in a case where an anomaly occurs in any of the temperature sensors provided in the respective heater sets, the difference between the detected temperatures becomes wider in the set to which the temperature sensors having the anomaly belongs. In addition, in a case where this temperature difference reaches the predetermined threshold value, only the actuation of the heater of the concerned heater set is stopped, and only the temperature of the heated portion corresponding thereto drops. This enables the rider to directly detect an anomaly in the temperature sensors and makes it possible to maintain the heating states of the other heater sets in which the temperature sensors have no anomalies.

According to the fifth aspect of the invention, the controller stops actuation of the heater based on the detection signal from the engine operation detector, whereby the consumption of relatively large power necessary to heat the component to be contacted with the body of the rider can be reduced, when an on-vehicle battery is no longer being charged because the engine is being stopped.

According to the sixth aspect of the invention, the first and second temperature sensors are respectively placed in the vicinity of the boundary between the seating portion and the backrest portion. The vicinity of the boundary is less prone to be contacted with a portion of a body of the rider when the rider is seated. Accordingly, even in the case where the temperature sensors are contained inside the seat, an influence on the rider's seating comfort can be reduced.

According to the seventh aspect of the invention, the first and second temperature sensors are placed on the backsides of the grips, whereby it becomes possible to reduce an influence on the detected temperatures by the cooling effect of traveling wind. Further, the first and second temperature sensors are placed in the vicinities of the side ends of the grips, whereby an influence on the rider's grip comfort can be reduced, even when the temperature sensors are contained inside the grips.

According to the eighth aspect of the invention, the first and second temperature sensors are integrally provided, and thereby, this can make it easier work for assembling and wiring the temperature sensors.

According to the ninth aspect of the invention, the first and second temperature sensors and the heating mechanism are integrally provided, and thereby, this can make it easier work for assembling and wiring these components.

It should be noted that along with the above-mentioned objects, other objects, characteristics, and advantages of the present invention will become apparent from the detailed description of the embodiment of the invention presented below in conjunction with the attached drawings. It should also be noted that directions such as front, back, left, and right in the description below are the same as those of a vehicle unless otherwise noted. Further, in the drawings, arrows FR, LH, and UP indicate the directions to the front side, left hand side, and upside of the vehicle, respectively. The embodiment described herein, and shown in the drawings, is intended to illustrate, rather than to limit the present invention. Although the following disclosure offered for public dissemination is specific and detailed, to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these claims that meet the requirement of pointing out the improvements, combinations and methods in which the inventive concepts are found.

DETAILED DESCRIPTION

Figure 1:
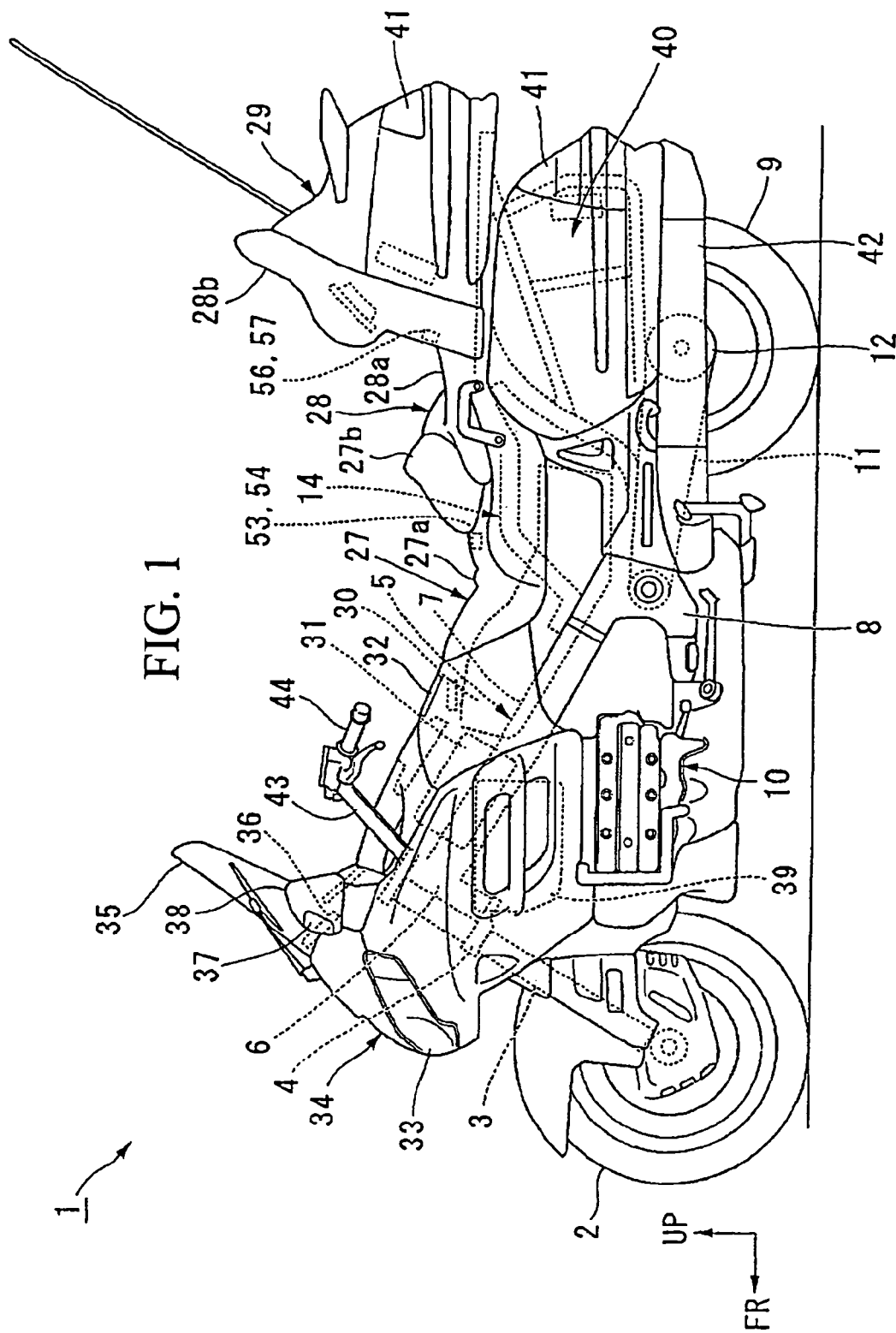
FIG. 1 is a side view of a two-wheeled motor vehicle including a heating apparatus according to an embodiment of the present invention.
Figure 2:
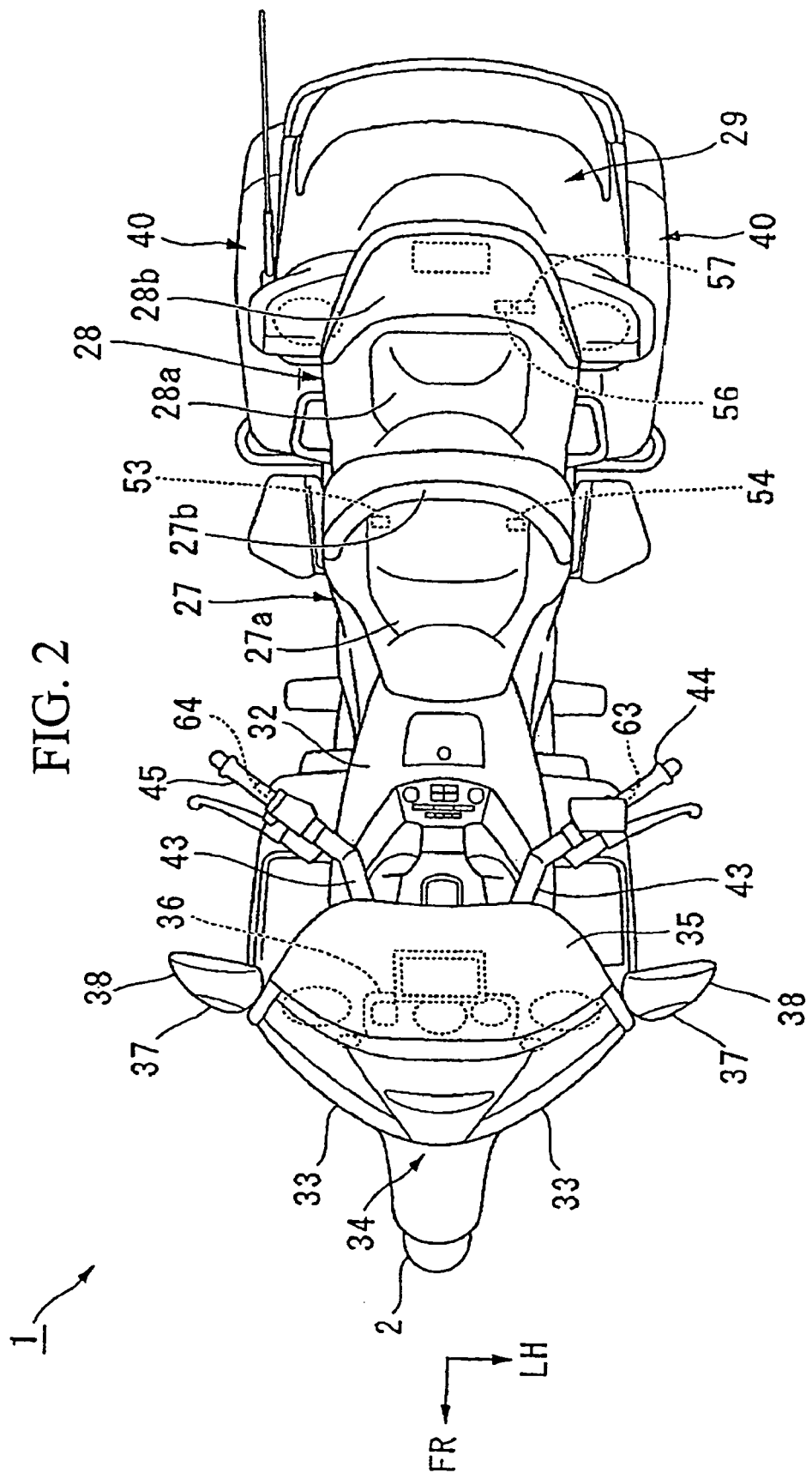
FIG. 2 is a top view of the two-wheeled motor vehicle.

As shown in FIGS. 1 and 2, a front wheel 2 of a two-wheeled motor vehicle 1 is pivotally supported at lower end portions of a pair of right and left front forks 3. An upper portion of each of the front forks 3 is pivotally supported through a steering stem 4 by a head pipe 6 at a front end portion of a vehicle body frame 5 so as to be steerable. Above the steering stem 4, a handlebar 43 for steering the front wheel is attached. From the head pipe 6, a pair of right and left main frames 7 extend diagonally downward toward the back. Under the main frames 7, a water-cooled four-stroke horizontally-opposed six-cylinder engine 10 is mounted which is a driving mover of the two-wheeled motor vehicle 1.

By a pivot plate 8 connected to each of rear end portions of the main frames 7, a front end portion of a swing arm 11, which pivotally supports a rear wheel 9, is supported so as to be pivotally swingable. The swing arm 11 is of a cantilever type, and at a rear end portion of the hollow cantilever arm thereof the rear wheel 9 is pivotally supported. In the cantilever arm, a drive shaft (not shown), which is extended from the engine 10, is inserted. This drive shaft and a gear box 12 at the center of the rear wheel make it possible to transmit driving power therethrough between the engine 10 and the rear wheel 9.

To a portion in the vicinity of the pivot plate 8, a front end portion of a seat frame 14 is connected to support the rider front and rear seats (components to be contacted with a portion of the bodies of the riders) 27 and 28. The front seat 27 is for a driver, and the rear seat 28 is for a rear passenger. The front seat 27 includes a front seat body 27a and a backrest 27b, and the rear seat 28 includes a rear seat body 28a and a seat back 28b. The front and rear seat bodies 27a and 28a are provided to be integrated with each other. The backrest 27b is placed between the front and rear seat bodies 27a and 28a. Behind the rear seat body 28a, a rear trunk 29 is placed. The seat back 28b is composed in a front portion of the rear trunk 29. In front of the front seat 27, there are placed a fuel tank 30 extending to a position under the front seat 27, an air cleaner box 31 for engine intake air, and the like. These are covered with a top shelter 32, which is an exterior component.

A large front cowl 34 including a pair of right and left headlamps 33, is provided in a front portion of a body of the two-wheeled motor vehicle 1. In an upper front portion of the front cowl 34, a large windscreen 35 is provided. A meter panel 36 including a speedometer, tachometer, and the like, is placed on the backside of an upper portion of the front cowl 34. The top shelter 32 is provided so as to continue from the meter panel 36 and to extend obliquely in the downward and backward direction. Thereby, the top shelter 32 covers the vehicle body from the backside of the front cowl 34 to the front seat 27. To both sides of the upper portion of the front cowl 34, right and left mirrors 38, which include front turn signals 37, are attached. On the inside of the front cowl 34 in the side-to-side direction (inside thereof in the vehicle width direction), a radiator 39 for the engine is placed so as to be approximately orthogonal to the side-to-side direction.

Right and left saddlebags 40 are placed on both sides below the rear seat 28 and the rear trunk 29. Rear combination lamps 41, which function as tail lamps, brake lamps, and rear turn signals, are placed on both sides of rear portions of these right and left saddlebags 40, and on both sides of a rear portion of the rear trunk 29. Under the right and left saddlebags 40, silencers 42 for engine exhaust air are placed.

Figure 3:
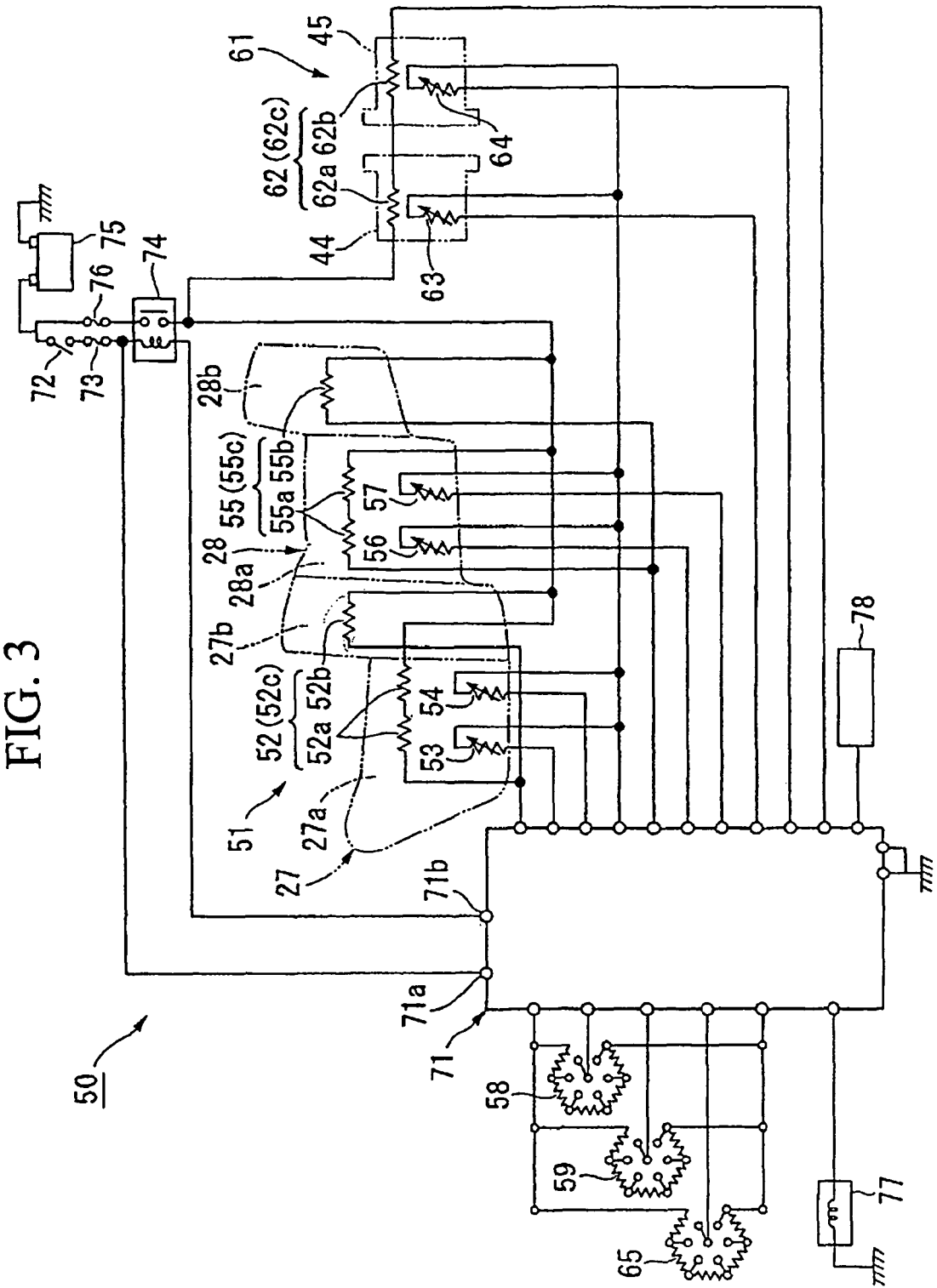
FIG. 3 is a view showing a configuration of a heating apparatus provided in the two-wheeled motor vehicle.

Here, as shown in FIG. 3, the two-wheeled motor vehicle 1 includes a heating apparatus (vehicle heating apparatus) 50 consisting mainly of a seat heater 51 and a grip heater 61.

Figure 4:
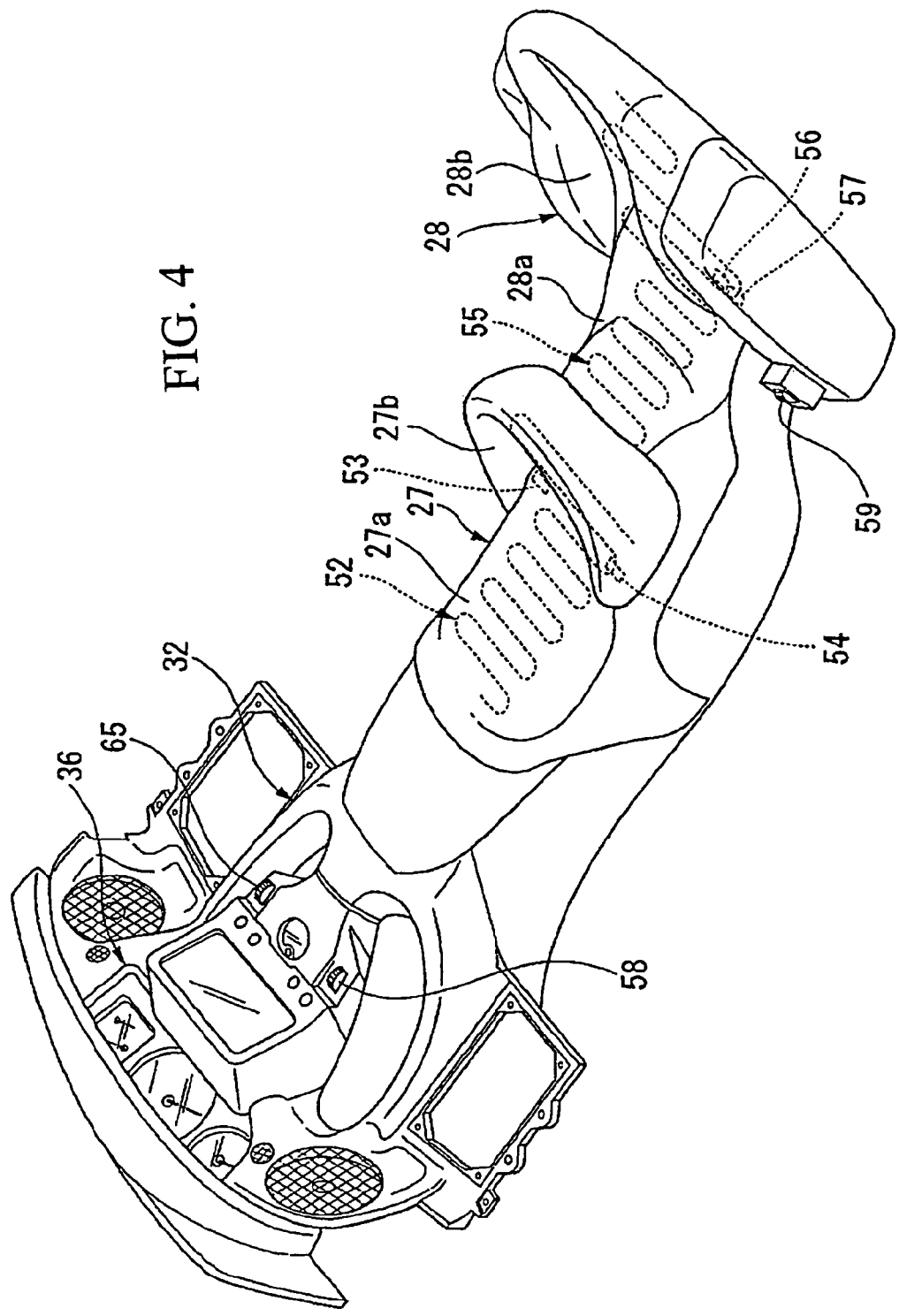
FIG. 4 is an explanatory perspective view showing an arrangement of seat heaters in the heating apparatus of FIG. 1.

Referring to FIG. 4 in addition, the seat heater 51 includes a front heater group (heating mechanism) 52 for heating a seating portion of the front seat 27, and a rear heater group (heating mechanism) 55 for heating a seating portion of the rear seat 28.

The front heater group 52 includes a front cushion heater 52a placed inside a seating surface (upper surface) of the front seat body 27a, and a backrest heater 52b placed inside a waist supporting surface (front surface) of the backrest 27b.

On the other hand, the rear heater group 55 includes a rear cushion heater 55a placed inside a seating surface (upper surface) of the rear seat body 28a, and a seat back heater 55b placed inside a back supporting surface (front surface) of the seat back 28b.

Each of the heaters 52a, 52b, 55a, or 55b is formed by, for example, fixing a heating wire folded in a bellows-like shape on a base sheet. One terminal of each of the heaters 52a, 52b, 55a, or 55b is connected to a heater controller (controlling mechanism) 71.

For the front heater group 52, first and second front thermistors (first and second temperature sensors) 53 and 54 are placed, for example, in the vicinity of the front cushion heater 52a. To be more detailed, the first and second front thermistors 53 and 54 are placed with an interval therebetween, for example, divided into the right and left, in the vicinity of the boundary between the front seat body 27a and the backrest 27b. Each of the front thermistors 53 or 54 makes it possible to detect a temperature (heating temperature of the front heater group 52) of the seating portion of the front seat 27. The heater controller 71 controls the amount of current supplied to the front heater group 52 in order that the temperature detected by each of the front thermistors 53 or 54 becomes a desired temperature adjusted with a front heater control switch 58.

On the other hand, for the rear heater group 55, first and second rear thermistors (first and second temperature sensors) 56 and 57 are placed, for example, in the vicinity of the rear cushion heater 55a. To be more detailed, the first and second rear thermistors 56 and 57 are placed, for example, close to each other in such a manner that they are biased to the left, in the vicinity of the boundary between the rear seat body 28a and the seat back 28b. Each of the rear thermistors 56 and 57 makes it possible to detect the temperature (heating temperature of the rear heater group 55) of the seating portion of the rear seat 28. The heater controller 71 controls the amount of current supplied to the rear heater group 55 in order that the temperature detected by each of the rear thermistors 56 and 57 becomes a desired temperature adjusted with a rear heater control switch 59.

The grip heater 61 is formed by including a heater group (heating mechanism) 62 for heating circumferential portions of the right and left grips (components to be contacted with the body of the rider) 44 and 45 of the handlebar 43. The heater group 62 includes right and left heaters 62a and 62b which are respectively placed around the circumferences of the right and left grips 44 and 45. One terminal of each of the right and left heaters 62a and 62b is connected to the heater controller 71.

Figure 5:
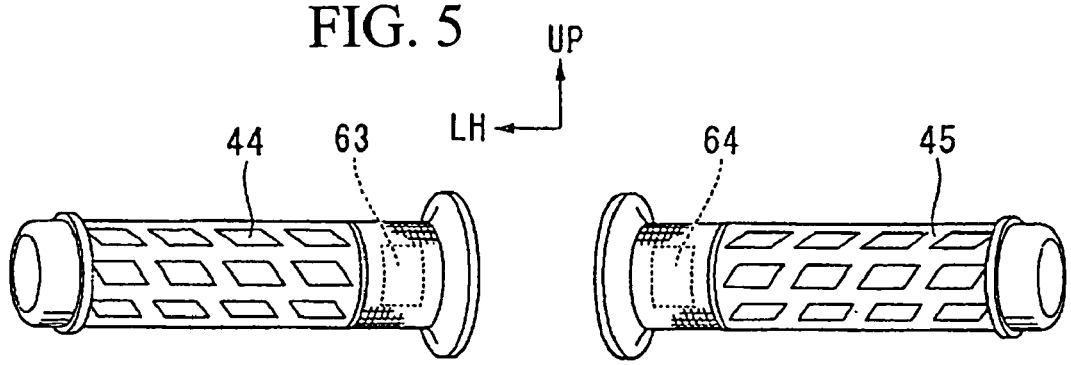
FIG. 5 is an explanatory perspective view showing an arrangement of grip heaters in the heating apparatus of FIG. 1.

Referring to FIGS. 3 and 5, right and left thermistors (first and second temperature sensors) 63 and 64 are placed in the vicinities of the heaters 62a and 62b, respectively. To be more detailed, the right and left thermistors 63 and 64 are placed inside the right and left grips 44 and 45 on the backsides thereof, in the vicinities of the inner ends thereof (or outer ends thereof). The thermistors 63 and 64 make it possible to detect the temperatures (heating temperatures of the heaters 62a and 62b) of the circumferential portions of the grips 44 and 45, respectively. The heater controller 71 controls the amount of current supplied to the heater group 62 in order that the temperature detected by each of the thermistors 63 or 64 becomes a desired temperature adjusted with a grip heater control switch 65.

Figure 6:
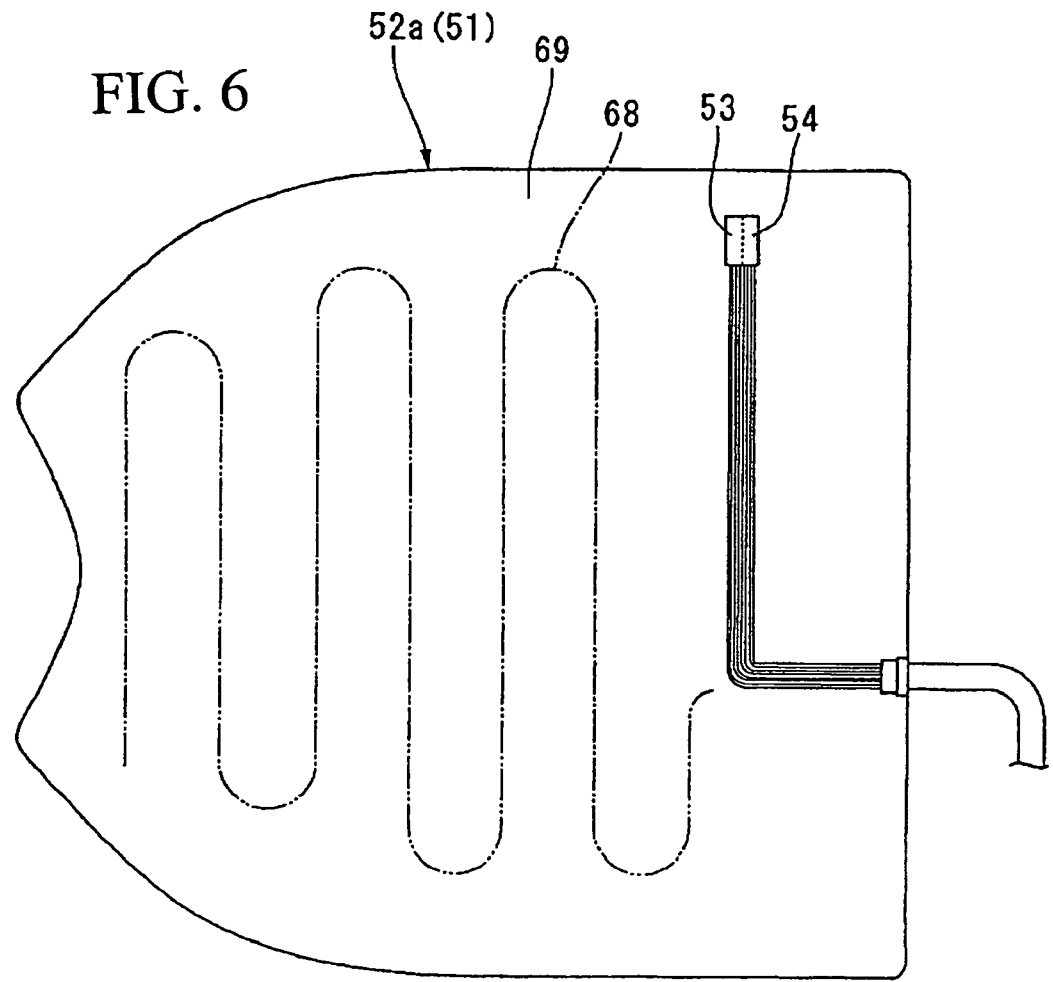
FIG. 6 is an explanatory perspective view showing an arrangement of a heater and thermistors in the seat heater according to an embodiment of the present invention.

Here, FIG. 6 shows an application example of the seat heater 51. As shown in this drawing, the front cushion heater 52a is formed by integrally fixing, on a base sheet 69, a heating wire 68 folded in a bellows-like shape. The first and second front thermistors 53 and 54 are integrally fixed to, for example, a right or left rear portion of the front cushion heater 52a. Further, the first and second front thermistors 53 and 54 are also integrated with each other. It is also possible to apply a form other than the above form, in which the first and second front thermistors 53 and 54 integrated with each other may be provided separately from the front cushion heater 52a, or in which all of the first and second thermistors 53 and 54, and the front cushion heater 52a may be provided separately from each other. It should be noted that the above-described configurations can also be applied to the rear cushion heater 55a (rear heater group 55).

Hereinafter, the heater set of the front heater group 52 and the first and second front thermistors 53 and 54, the heater set of the rear heater group 55 and the first and second rear thermistors 56 and 57, and the heater set of the heater group 62 and the right and left thermistors 63 and 64 are referred to as a front seat heater set 52c, a rear seat heater set 55c, and a grip heater set 62c, respectively.

As shown in FIG. 3, when an ignition switch 72 is turned on (in a connected state), an on-vehicle battery 75 and a power input terminal 71a of the heater controller 71 are connected through a main fuse 73. At this time, a relay control terminal 71b of the heater controller 71 is also connected to the on-vehicle battery 75 through the main fuse 73 and a coil side of a relay 74.

Each of the heater control switches 58, 59, and 65 makes it possible to adjust the outputs from the heater groups 52, 55, and 62, respectively, and may be of a dial type in which a temperature can be adjusted, for example, in five levels other than a heater stop position (OFF position). In terms of these heater control switches 58, 59, and 65, the front heater control switch 58 is placed on the left side near a steering shaft on the top shelter 32, the grip heater control switch 65 is placed on the right side of the steering shaft, also on the top shelter 32, and the rear heater control switch 59 is placed on a lower left portion of the seat back 28b (see FIG. 4) in the depicted embodiment.

Here, the heater controller 71 calculates the average of temperatures detected by the first and second front thermistors 53 and 54, and controls the output to the front heater group 52 based on the average. Similarly, the heater controller 71 calculates the average of temperatures detected by the first and second rear thermistors 56 and 57, and controls the output from the rear heater group 55 based on the average. Further, the heater controller 71 calculates the average of temperatures detected by the thermistors 63 and 64, and controls the output from the heater group 62 based on the average.

At this time, for example, in a case where the heater controller 71 detects that the difference between temperatures detected by the first and second front thermistors 53 and 54 reaches a predetermined threshold value, the heater controller 71 determines that an anomaly such as a breakdown occurs in one of the first and second front thermistors 53 and 54, and stops supplying power to the front heater group 52 which is part of the set with these thermistors 53 and 54.

Similarly, in a case where the heater controller 71 detects that the difference between temperatures detected respectively by the first and second rear thermistors 56 and 57 reaches a predetermined threshold value, the heater controller 71 determines that an anomaly occurs in one of the first and second rear thermistors 56 and 57, and stops supplying power to the rear heater group 55 which is part of the set with these thermistors 56 and 57. Moreover, in a case where the heater controller 71 detects that the difference between temperatures detected respectively by the right and left thermistors 63 and 64 reaches a predetermined threshold value, the heater controller 71 also determines that an anomaly occurs in one of the right and left thermistors 63 and 64, and stops supplying power to the heater group 62 which is part of the set with these thermistors 63 and 64.

In other words, in a case where the difference between the detected temperatures in any of the plurality of heater sets 52c, 55c, and 62c has exceeded a predetermined threshold value, the heater controller 71 determines that an anomaly occurs in a thermistor of the concerned set and stops supplying power only to the heater group of the concerned set. At this time, there is a possibility that the heater groups of a plurality of heater sets will simultaneously stop. It should be noted that the heater groups of all the heater sets may also be stopped in the case where the difference between the detected temperatures in any of the heater sets has exceeded a predetermined threshold value.

An anomaly warning lamp (anomaly alarm) 77 is provided on the meter panel 36 or the like, and is connected to the heater controller 71. In the case where an anomaly in a thermistor has been detected as described above, the heater controller 71 turns on the anomaly warning lamp 77 (or may flash it or turn it off) to warn the operator. It should be noted that instead of the anomaly alarm 77, anomaly warning mechanism displaying a word or a symbol or making a sound, or a combination of various ones of these may be employed.

Further, an ECU (an electrical control unit, engine operation detecting mechanism) 78 for an electronic controlled fuel injection device (FI) of the engine 10 of the two-wheeled motor vehicle 1 is connected to a control unit. Thereby, in a case where the engine 10 is in an operating state, the control unit receives a detection signal from the ECU 78. The heater controller 71 supplies power to the heater groups 52, 55, and 62, the power respectively corresponding to the heater control switches 58, 59, and 65, only when the ignition switch 72 is in a turned-on state and it is determined that the engine 10 is in an operating state, based on the detection signal from the ECU 78. On the other hand, the heater controller 71 stops supplying the power to the heater groups 52, 55, and 62, even if the ignition switch 72 and the heater control switches 58, 59, and 65 are in turned-on states, when it is determined that the engine 10 is being stopped.

As described above, in the vehicle heating apparatus 50 of the above-described embodiment, the front and rear heater groups 52 and 55 are provided in the front and rear seats 27 and 28, and the heater group 62 is provided in the right and left grips 44 and 45. The front and rear seats 27 and 28 include respectively the thermistors 53, 54, 56, and 57 for detecting the temperatures thereof, and each of the right and left grips 44 and 45 include the thermistors 63 and 64 for detecting the temperatures thereof. The vehicle heating apparatus 50 further includes the heater controller 71 which stops the front heater group 52 when the difference between temperatures detected respectively by the first and second front thermistors 53 and 54 reaches a predetermined threshold value, stops the rear heater group 55 when the difference between temperatures detected respectively by the first and second rear thermistors 56 and 57 reaches a predetermined threshold value, and stops the heater group 62 when the difference between temperatures detected respectively by the right and left thermistors 63 and 64 reaches a predetermined threshold value.

With this configuration, for example, in a case where an anomaly occurs in one of the first and second front thermistors 53 and 54 in the front seat 27, the difference between temperatures detected respectively by these first and second front thermistors 53 and 54 becomes wider. Accordingly, in the case where the temperature difference reaches the predetermined threshold value, the front heater group 52 is stopped and the temperature of the heated portion (seating surface of the front seat 27) drops. This enables a rider to directly detect an anomaly in any of the first and second front thermistors 53 and 54. It should be noted that since the rear seat 28 and the right and left grips 44 and 45 also have a same function and an effect as the above-described, the description is omitted here.

Further, the vehicle heating apparatus 50 includes the anomaly warning lamp 77, which provides an external warning to the user (rider), indicating an anomaly in any of the thermistors, of an event in which the difference between the detected temperatures reaches a predetermined threshold value, when it occurs. Accordingly, the rider can detect the anomaly of the thermistor earlier and more accurately than when the rider senses a temperature drop in any one of the front and rear seats 27 and 28, and the left and right grips 44 and 45.

Moreover, in the vehicle heating apparatus 50, the output from the front heater group 52 is controlled based on the average of temperatures detected by the first and second front thermistors 53 and 54, the output from the rear heater group 55 may be controlled based on the average of temperatures detected by the first and second rear thermistors 56 and 57, and the output from the heater group 62 may be controlled based on the average of temperatures detected by the right and left thermistors 63 and 64. Accordingly, each of the temperature detections of the front and rear seat 27 and 28 and the right and left grips 44 and 45 may be performed by using two thermistors. Thus, the temperatures of the front and rear seats 27 and 28 and the right and left grips 44 and 45 can be detected more accurately than they are detected by using a single thermistor, whereby the outputs from the heater groups 52, 55, and 62 can be accurately controlled based on the detected temperatures.

Furthermore, the vehicle heating apparatus 50 includes the front seat heater set 52c, the rear seat heater set 55c, and the grip heater set 62c, wherein each of the sets includes the heater group and the two thermistors. When the difference between the detected temperatures in any of the sets 52c, 55c, and 62c reaches the predetermined threshold value, only the heater group of the concerned heater set may have the power supply thereto stopped. Accordingly, in a case where an anomaly occurs in any of the thermistors of the respective heater sets, the difference between the detected temperatures becomes wider in the heater set to which the thermistor having the anomaly belongs. Then, in a case where this temperature difference reaches the predetermined threshold value, actuation of only the heater group of the concerned heater set is stopped, and only the temperature of the heated portion corresponding thereto drops. This enables the rider to directly detect an anomaly in any of the thermistors and makes it possible to maintain the heating states of the other sets in which the thermistors have no anomalies.

Further, the vehicle heating apparatus 50 includes the ECU 78 as engine operation detecting mechanism for detecting the operating state of the engine 10. When the heater controller 71 determines that the engine 10 is being stopped, based on a detection signal from the ECU 78, the heater controller 71 stops each of the heater groups 52, 55, and 62. Thus, though the on-vehicle battery 75 is generally not charged while the engine 10 is stopped, the consumption of a relatively large supply power necessary to heat the front and rear seats 27 and 28 and the right and left grips 44 and 45 can be reduced by stopping power supply to the heater groups 52, 55 and 62 as described.

Here, in the seat heater 51 of the Vehicle heater apparatus 50, the first and second front thermistors 53 and 54 may be placed inside the front seat 27 in the vicinity of the boundary between the front seat body 27a and the backrest 27b, and the first and second rear thermistors 56 and 57 may be placed inside the rear seat 28 in the vicinity of the boundary between the rear seat body 28a and the seat back 28b. Accordingly, each of the thermistors 53, 54, 56, and 57 become less prone to contact with the bodies of riders when the riders are seated. Even in the case where each of the thermistors 53, 54, 56, and 57 is contained in the front and rear seats 27 and 28, it is possible to reduce an influence on rider seating comfort.

Moreover, in the grip heater 61 of the vehicle heater apparatus 50, the right and left thermistors 63 and 64 may be placed inside the right and left grips 44 and 45 on the backsides in the vicinities of the side ends thereof. This makes it possible to reduce an influence on the detected temperatures by a cooling effect of traveling wind on the thermistors 63 and 64. Further, since the thermistors 63 and 64 are respectively placed in the vicinities of the side ends of the right and left grips 44 and 45, it makes it possible to reduce an influence on the rider's grip comfort of the right and left grips 44 and 45, even when the thermistors 63 and 64 are contained inside the right and left grips 44 and 45.

Furthermore, in the vehicle heater apparatus 50, the first and second front thermistors 53 and 54 (or first and second rear thermistors 56 and 57) may be provided integrally with each other, or provided integrally with the front heater group 52 (or the rear heater group 55). This can simplify the work for assembling and wiring the respective thermistors 53, 54, 56, and 57 and the respective heater groups 52 and 55.

While a working example of the present invention has been described above, the present invention is not limited to the working example described above, it is a matter of course the configuration of the above described embodiment is one example of the present invention, and that various modifications can be made without deviating from the scope of the present invention as reflected in the appended claims. For example, a further configuration may be provided in which either only a seat heater or a grip heater is included. Further, a thermocouple or the like may be used as a mechanism for detecting a temperature of a seat or the like, instead of a thermistor. Furthermore, a crank sensor, a throttle sensor, or the like may be used as a mechanism for detecting an operating state of an engine, instead of an ECU for FI.

Here, as is the case with the front and rear seats 27 and 28, in the grip heaters 61, two thermistors may be provided in each of the right and left grips 44 and 45, and provided integrally with each of the left or right heater 62a or 62b. At this time, the two thermistors may be integrated with each other, or all of the thermistors and the right and left heaters 62a and 62b may be provided separately from each other.

Moreover, the present invention can also be applied to a four-wheeled vehicle. As one example in this case, it is possible to conceive a configuration in which a seat heater is provided in each of a plurality of seats in a vehicle interior, and in which a set of a heater group and two thermistors is provided for each of the seats. Further, without limiting to seat heaters, heaters for a steering wheel and a shift knob may be provided, and a set of a heater group and two thermistors may also be provided for each of the heaters.

What is claimed is:

1. A vehicle heating apparatus comprising:
   a heater group including one or more heaters in a component to be contacted with a portion of a body of a rider;
   first and second temperature sensors which detect the temperature of the component to be contacted with a portion of a body of the rider; and
   a controller which:
   controls power supplied to the heater group, thereby heating the component to a desired level;
   monitors first and second temperature readings respectively from the first and second temperature sensors;
   calculates a difference between the first and second temperature readings;
   identifies a sensor anomaly in the vehicle heating apparatus based on the calculated difference reaching a predetermined threshold value; and
   stops actuation of the heater group when the sensor anomaly has been identified.

2. The vehicle heating apparatus according to claim 1, further comprising an anomaly alarm, wherein the controller further provides a warning to a user by activating the alarm when the sensor anomaly has been identified.

3. The vehicle heating apparatus according to claim 1, wherein the power supplied to the heater group is controlled based on an average of the first and second temperature readings of the first and second temperature sensors.

4. The vehicle heating apparatus according to claim 1, wherein the heater group includes a seat heater and the first and second temperature sensors are placed inside a seat in a vicinity of a boundary between a seating portion and a backrest portion.

5. The vehicle heating apparatus according to claim 1, wherein the heater group includes a grip heater of a handlebar for a two-wheeled motor vehicle, and the first and second temperature sensors are placed inside the grips on the backsides of the grips in vicinities of side ends thereof.

6. The vehicle heating apparatus according to claim 1, wherein the first and second temperature sensors are integrally provided together.

7. The vehicle heating apparatus according to claim 1, wherein the first and second temperature sensors and the heater group are integrally provided together.

8. The vehicle heating apparatus according to claim 1, further comprising an engine operation detector which detects an operating state of an engine and outputs a detection signal; and wherein the controller is further configured to:
   detect the detection signal from the engine operation detector; and
   stop actuation of the heater group when the detection signal indicates that the engine is not operating.

9. A vehicle heating apparatus comprising:
   a heater group including one or more heaters in a component to be contacted with a portion of a body of a rider; and
   first and second temperature sensors which detect the temperature of the component to be contacted with a portion of a body of the rider;
   an engine operation detector which detects an operating state of an engine and outputs a detection signal; and
   a controller which:
      controls power supplied to the heater group, thereby heating the component to a desired level;
      monitors first and second temperature readings respectively from the first and second temperature sensors;
      identifies a sensor anomaly in the heater group based on a difference between the first and second temperature readings reaching a predetermined threshold value;
      stops actuation of the heaters of the heater group when the sensor anomaly has been identified; and
      stops actuation of the heater group when the detection signal from the engine operation detector indicates that the engine is not operating.

10. The vehicle heating apparatus according to claim 9, wherein an output from the heater group is controlled based on an average of the temperatures detected by the first and second temperature sensors.

11. The vehicle heating apparatus according to claim 9, wherein the heater group includes a seat heater wherein the first and second temperature sensors are placed inside a seat in a vicinity of a boundary between a seating portion and a backrest portion.

12. The vehicle heating apparatus according to claim 9, wherein the heater group includes a grip heater of a handlebar for a two-wheeled motor vehicle wherein the first and second temperature sensors are placed inside the grips on the backsides of the grips in vicinities of side ends thereof.

13. The vehicle heating apparatus according to claim 9, wherein the first and second temperature sensors are integrally provided together.

14. The vehicle heating apparatus according to claim 9, wherein the first and second temperature sensors and the heater group are integrally provided together.

15. A vehicle including a heating apparatus comprising:
   a first seat heater set, a second heater set, and a hand grip heater set, each said heater set including:
      a heater group including one or more heaters in an associated vehicle component to be contacted with a portion of a body of a rider of the vehicle; and
      a pair of temperature sensors which detect the temperature of the associated vehicle component to be contacted with a portion of a body of the rider; and a controller which:
   controls power supplied to the heater groups of of the heater sets, thereby heating the components associated with the heater sets to desired levels;
   monitors first and second temperature readings respectively from the pair of temperature sensors of each of the heater sets;
   identifies a sensor anomaly in any of the heater sets based on a difference between the first and second temperature readings from the pair of temperature sensors of the associated heater set reaching a predetermined threshold value; and
   stops actuation of the heater group of the associated heater set when the sensor anomaly has been identified for the pair of temperature sensors of the associated heater set.

16. The vehicle according to claim 15, further comprising an anomaly alarm, and wherein the controller further provides a warning to a user by activating the anomaly alarm when the sensor anomaly has been identified for the pair of temperature sensors of any of the heater sets.

17. The vehicle according to claim 15, wherein the power supplied to the heater group of each said heater set is controlled based on an average of the first and second temperature readings of the pair of temperature sensors of the associated heater set.

18. The vehicle according to claim 15, further comprising an engine operation detector which detects an operating state of an engine and outputs a detection signal; and
   wherein the controller further:
      detects the detection signal from the engine operation detector; and
      stops actuation of the heater groups of the heater sets when the detection signal from the engine operation detector indicates that the engine is not operating.

19. The vehicle heating apparatus according to claim 1, wherein said heater group and said first and second temperature sensors jointly constitute a first heater set, the vehicle heating apparatus further comprise a second heater set including a second heater group including one or more heaters in a second component to be contacted with a second portion of the body of the rider and third and fourth temperature sensors which detect the temperature of the second component to be contacted with the second portion of the body of the rider;
   wherein the controller functions independently relative to each of the first and second heater sets, including stopping actuation of the first heater set when a sensor anomaly has been identified based on the difference between the first and second temperature readings of the first and second temperature sensors reaching the predetermined threshold value, and stopping actuation of the second heater set when a sensor anomaly has been identified based on a difference between third and fourth temperature readings of the third and fourth temperature sensors reaching the predetermined threshold value.

20. The vehicle heating apparatus according to claim 19, wherein each of the first and second heater sets further includes a control switch configured to allow an operator of the vehicle to selectively adjust the heat output of the associated heater set.

* * * * *